United States Patent
Green et al.

(10) Patent No.: US 9,639,812 B1
(45) Date of Patent: May 2, 2017

(54) SYSTEM AND METHOD FOR ACCOMMODATING DISRUPTED TRAVELERS

(71) Applicant: American Airlines, Inc., Fort Worth, TX (US)

(72) Inventors: Tuell Coleman Green, Euless, TX (US); Ande Murali, Euless, TX (US); Steven D. Leist, Euless, TX (US); James Tullos Diamond, Grapevine, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 134 days.

(21) Appl. No.: 13/942,973

(22) Filed: Jul. 16, 2013

Related U.S. Application Data

(63) Continuation of application No. 11/020,856, filed on Dec. 23, 2004, now abandoned.

(51) Int. Cl.
G06Q 10/02 (2012.01)

(52) U.S. Cl.
CPC .................. *G06Q 10/025* (2013.01)

(58) Field of Classification Search
None
See application file for complete search history.

(56) References Cited

U.S. PATENT DOCUMENTS

| | | |
|---|---|---|
| 4,862,357 A * | 8/1989 | Ahlstrom et al. ................ 705/6 |
| 5,021,953 A | 6/1991 | Webber et al. |
| 6,496,568 B1 | 12/2002 | Nelson |
| 7,263,664 B1 | 8/2007 | Daughtrey |
| 7,809,581 B1 * | 10/2010 | Neal et al. .................... 705/1.1 |
| 2003/0018499 A1 * | 1/2003 | Miller et al. ..................... 705/5 |
| 2003/0225600 A1 * | 12/2003 | Slivka et al. ..................... 705/5 |
| 2005/0125267 A1 * | 6/2005 | Bramnick ............. G06Q 10/02 705/5 |

OTHER PUBLICATIONS

Declaration of Tuell Coleman Green in Response to Requirements for Information under 37 C.F.R. § 1.105 made Sep. 20, 2013, 3 pages.
Exhibit A to Declaration of Tuell Coleman Green: Final Office Action for U.S. Appl. No. 11/020,856 mailed Jan. 17, 2013, 62 pages.
Exhibit B to Declaration of Tuell Coleman Green: Hillier, Frederick S., and Gerald J. Lieberman, "Introduction to Operations Research", Chapter 7: Special Types of Linear Programming Problems (pp. 208-266), 5th Edition, McGraw-Hill Publishing Company, 1990.
Exhibit C to Declaration of Tuell Coleman Green: Hillier, Frederick S., and Gerald J. Lieberman, "Introduction to Operations Research", Chapter 13: Integer Programming (pp. 457-498), 5th Edition, McGraw-Hill Publishing Company, 1990.
Office Action for U.S. Appl. No. 11/020,856 mailed Oct. 2, 2009, 30 pages.
Final Office Action for U.S. Appl. No. 11/020,856 mailed Mar. 31, 2010, 33 pages.
Advisory Action for U.S. Appl. No. 11/020,856 mailed Jun. 14, 2010, 3 pages.
Office Action for U.S. Appl. No. 11/020,856 mailed Apr. 26, 2012, 49 pages.

* cited by examiner

*Primary Examiner* — Paul R Fisher
(74) *Attorney, Agent, or Firm* — Haynes and Boone, LLP

(57) ABSTRACT

A system and method for accommodating disrupted travelers utilizing scoring and optimization techniques.

8 Claims, 13 Drawing Sheets

Fig. 3

| Frequent Flyer Level | Historical Profitability | Assigned Priority |
|---|---|---|
| PLATINUM | 1 | 1 |
| PLATINUM | 2 | 1 |
| PLATINUM | 3 | 2 |
| GOLD | 1 | 1 |
| GOLD | 2 | 2 |
| GOLD | 3 | 2 |
| SILVER | 1 | 1 |
| SILVER | 2 | 2 |
| SILVER | 3 | 2 |
| BRONZE | 1 | 2 |
| BRONZE | 2 | 3 |
| BRONZE | 3 | 4 |
| NONE | NONE | 5 |

Fig. 4

| Fare Class | Cabin Class | Assigned Priority |
|---|---|---|
| A | First | 1 |
| B | First | 1 |
| C | First | 2 |
| D | First | 3 |
| E | Business | 2 |
| F | Business | 2 |
| G | Business | 3 |
| H | Business | 3 |
| I | Coach | 3 |
| J | Coach | 3 |
| K | Coach | 4 |
| L | Coach | 4 |
| M | Coach | 4 |
| N | Coach | 5 |

Fig. 10

| PNR | Party | Frequent Flyer Level | Historical Profitability | Original Flight Segments | | | | |
|---|---|---|---|---|---|---|---|---|
| 1 | 2 | Gold | 1 | 1 | 1131 | BDL | ORD | 11:34am 1:02pm |
| 2 | 1 | Platinum | 2 | 1 | 1131 | BDL | ORD | 11:34am 1:02pm |
|   |   |   |   | 2 | 1986 | ORD | DTW | 1:32pm 3:50pm |
| 3 | 1 |   | 3 | 1 | 1131 | BDL | ORD | 11:34am 1:02pm |
|   |   |   |   | 2 | 1323 | ORD | MCI | 2:50pm 4:20pm |
| 4 | 1 |   | 4 | 1 | 1131 | BDL | ORD | 11:34am 1:02pm |
|   |   |   |   | 2 | 1323 | ORD | MCI | 2:50pm 4:20pm |
| 5 | 4 |   | 4 | 1 | 1131 | BDL | ORD | 11:34am 1:02pm |
|   |   |   |   | 2 | 97 | ORD | SJC | 2:55pm 5:30pm |

Fig. 12

| PNR | ItinID | Flight # | Org | Dest | Dep | Arv | Avail Seats | Score |
|---|---|---|---|---|---|---|---|---|
| 1 | 1 | 1147 | BDL | ORD | 3:32pm | 5:03pm | 2 | 9 |
| 2 | 2 | 1147 | BDL | ORD | 3:32pm | 5:03pm | 2 | 12 |
| | | 1446 | ORD | DTW | 5:32pm | 7:42pm | 4 | |
| | 3 | 515 | BDL | DFW | 1:47pm | 4:50pm | 8 | 14 |
| | | 676 | DFW | DTW | 5:16pm | 8:47pm | 4 | |
| 3 | 4 | 515 | BDL | DFW | 1:47pm | 4:50pm | 8 | 10 |
| | | 3078 | DFW | MCI | 5:21pm | 6:55pm | 4 | |
| | 5 | 1147 | BDL | ORD | 3:32pm | 5:03pm | 2 | 12 |
| | | 409 | ORD | MCI | 6:30pm | 8:02pm | 4 | |
| 4 | 4 | 515 | BDL | DFW | 1:47pm | 4:50pm | 8 | 10 |
| | | 3078 | DFW | MCI | 5:21pm | 6:55pm | 4 | |
| | 5 | 1147 | BDL | ORD | 3:32pm | 5:03pm | 2 | 12 |
| | | 409 | ORD | MCI | 6:30pm | 8:02pm | 4 | |
| 5 | 6 | 515 | BDL | DFW | 1:47pm | 4:50pm | 8 | 9 |
| | | 2483 | DFW | SJC | 5:50pm | 7:36pm | 4 | |
| | 7 | 1147 | BDL | ORD | 3:32pm | 5:03pm | 2 | 12 |
| | | 1383 | ORD | SJC | 6:57pm | 9:25pm | 4 | |

Fig. 13

| PNR | Party | Frequent Flyer Level | Historical Profitability | Fare Class | Assigned Priority |
|---|---|---|---|---|---|
| 1 | 2 | Gold | 1 | A | 1 |
| 2 | 1 | Platinum | 2 | F | 1 |
| 3 | 1 | Bronze | 2 | J | 3 |
| 4 | 1 | Bronze | 4 | N | 4 |
| 5 | 4 | | 4 | L | 4 |

Fig. 14

| PNR | ItinID | Flight # | Org | Dest | Dep | Arv | Avail Seats | Score |
|---|---|---|---|---|---|---|---|---|
| 1 | (1) | 1147 | BDL | ORD | 3:32pm | 5:03pm | 2 | 9 |
| 2 | 2 | 1147<br>1446 | BDL<br>ORD | ORD<br>DTW | 3:32pm<br>5:32pm | 5:03pm<br>7:42pm | 2<br>4 | 12 |
| 2 | (3) | 515<br>676 | BDL<br>DFW | DFW<br>DTW | 1:47pm<br>5:16pm | 4:50pm<br>8:47pm | 8<br>4 | 14 |
| 3 | (4) | 515<br>3078 | BDL<br>DFW | DFW<br>MCI | 1:47pm<br>5:21pm | 4:50pm<br>6:55pm | 7<br>4 | 10 |
| 3 | 5 | 1147<br>409 | BDL<br>ORD | ORD<br>MCI | 3:32pm<br>6:30pm | 5:03pm<br>8:02pm | 0<br>4 | 12 |
| 4 | (4) | 515<br>3078 | BDL<br>DFW | DFW<br>MCI | 1:47pm<br>5:21pm | 4:50pm<br>6:55pm | 6<br>3 | 10 |
| 4 | 5 | 1147<br>409 | BDL<br>ORD | ORD<br>MCI | 3:32pm<br>6:30pm | 5:03pm<br>8:02pm | 0<br>4 | 12 |
| 5 | (6) | 515<br>2483 | BDL<br>DFW | DFW<br>SJC | 1:47pm<br>5:50pm | 4:50pm<br>7:36pm | 6<br>4 | 9 |
| 5 | 7 | 1147<br>1383 | BDL<br>ORD | ORD<br>SJC | 3:32pm<br>6:57pm | 5:03pm<br>9:25pm | 0<br>4 | 12 |

SYSTEM AND METHOD FOR ACCOMMODATING DISRUPTED TRAVELERS

CROSS-REFERENCE TO RELATED APPLICATION

This application is a continuation of U.S. application Ser. No. 11/020,856, filed Dec. 23, 2004, the entire disclosure of which is hereby incorporated herein by reference.

BACKGROUND

This invention relates to a system and method for accommodating disrupted travelers, more particularly, to an automated system and method for rebooking disrupted travelers to minimize the disruption to the travelers.

In the travel industry, travel providers are constantly trying to find ways to attract new customers and increase customer loyalty, while maintaining profitability. Frequency of travel delays and the impact of the same are two areas that have a significant impact on customer satisfaction and, consequently, customer loyalty. In some circumstances, such as, for example bad weather, travel delays are inevitable. Therefore, recognizing that some travel delays are unavoidable, some travel providers are focusing on minimizing the impact of travel delay on travelers.

BRIEF DESCRIPTION OF THE DRAWINGS

FIG. 3 is an illustration of the exemplary traveler priority assignments for the process for accommodating disrupted travelers of FIG. 2.

FIG. 4 is an illustration of the another exemplary traveler priority assignments for the process for accommodating disrupted travelers of FIG. 2.

FIG. 10 is an exemplary list of passengers affected by an example disrupting event to demonstrate the process of FIG. 2.

FIG. 12 is an illustration of exemplary generated alternative itineraries for the passengers listed in FIG. 10 scored in accordance with the process of FIG. 2.

FIG. 13 is an exemplary list of factors that may be used to segment the passengers of FIG. 10 into groups in accordance with an embodiment the process of FIG. 2.

FIG. 14 is an illustration of exemplary selected alternative itineraries for the passengers listed in FIG. 10 utilizing the process in FIG. 2.

DETAILED DESCRIPTION

Figure 1:
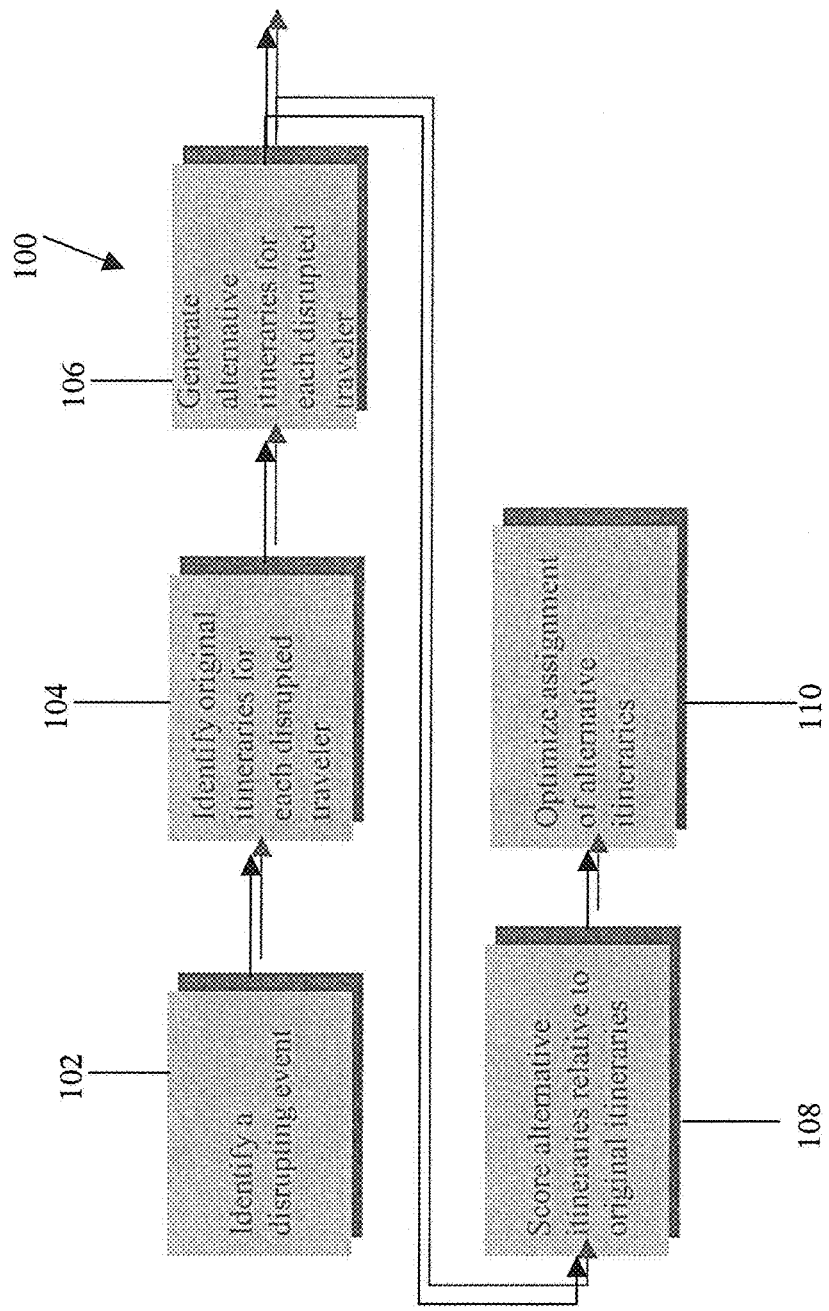
FIG. 1 is flow chart illustration of an exemplary embodiment of a process for accommodating disrupted travelers.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

Referring to FIG. 1, an exemplary embodiment of a process 100 for accommodating disrupted travelers is illustrated. The accommodation process 100 may begin by identifying a disrupting event in step 102. The disrupting event may be an actual event, such as, for example, a transportation vehicle cancellation or delay. The disrupting event may also be an anticipated or desired transportation vehicle cancellation, delay or reschedule, such as, for example, a transportation provider may see the need to cancel, delay or reschedule a transportation vehicle and may want to assess the impact that the cancellation, delay or reschedule may have on the travelers.

Once the disrupting event is identified the original travel itineraries for a group of disrupted travelers may be identified, step 104. In an exemplary embodiment, the original travel itinerary may be the itinerary reflecting the travel scheduled when it was first booked or a modified itinerary, which ever one reflects the accurate travel schedule of a disrupted traveler at the time of the disrupting event. In order to accommodate the largest number of passengers, the group of disrupted travelers may consist of all passengers affected by the disrupting event. However, a subset of the entire group may be selected, such as, for example, in a flight delay scenario, only those travelers that will miss a future connecting flight due to the delay may be selected.

Alternative itineraries may also be generated for each disrupted traveler in the group, step 106. Limits on the number of alternative itineraries may be set in any way, such as, for example, the number of alternatives generated may be limited by a specified predetermined number or by the proximity of the departure time or arrival time to the same in the original itineraries. The alternative itineraries may be generated prior to the identification of the original itineraries.

Once both the original and alternative itineraries are generated for each disrupted traveler in the group, a score may be generated for each alternative itinerary relative to the respective original itineraries, step 108. A score may be based on any predetermined criteria, such as, for example, any or all of the following: the new departure time; new arrival time; cabin downgrade; cabin upgrade; new number of stops; new elapsed time; and/or new departure or arrival airport. Each criterion may be weighted based on the impact to the traveler.

Any conventional optimization technique may be used to assign an alternative itinerary to the disrupted travelers, step 110. The optimization may be based on any factors, such as, for example, the score of the alternative itineraries, the total number of travelers disrupted, the total number of seats available associated with alternate routes, number of travelers traveling together, and/or penalties associated with alternative itineraries if any. The optimization may be performed in stages. For example, itineraries may be assigned for particular sets of travelers one at a time.

Figure 2:
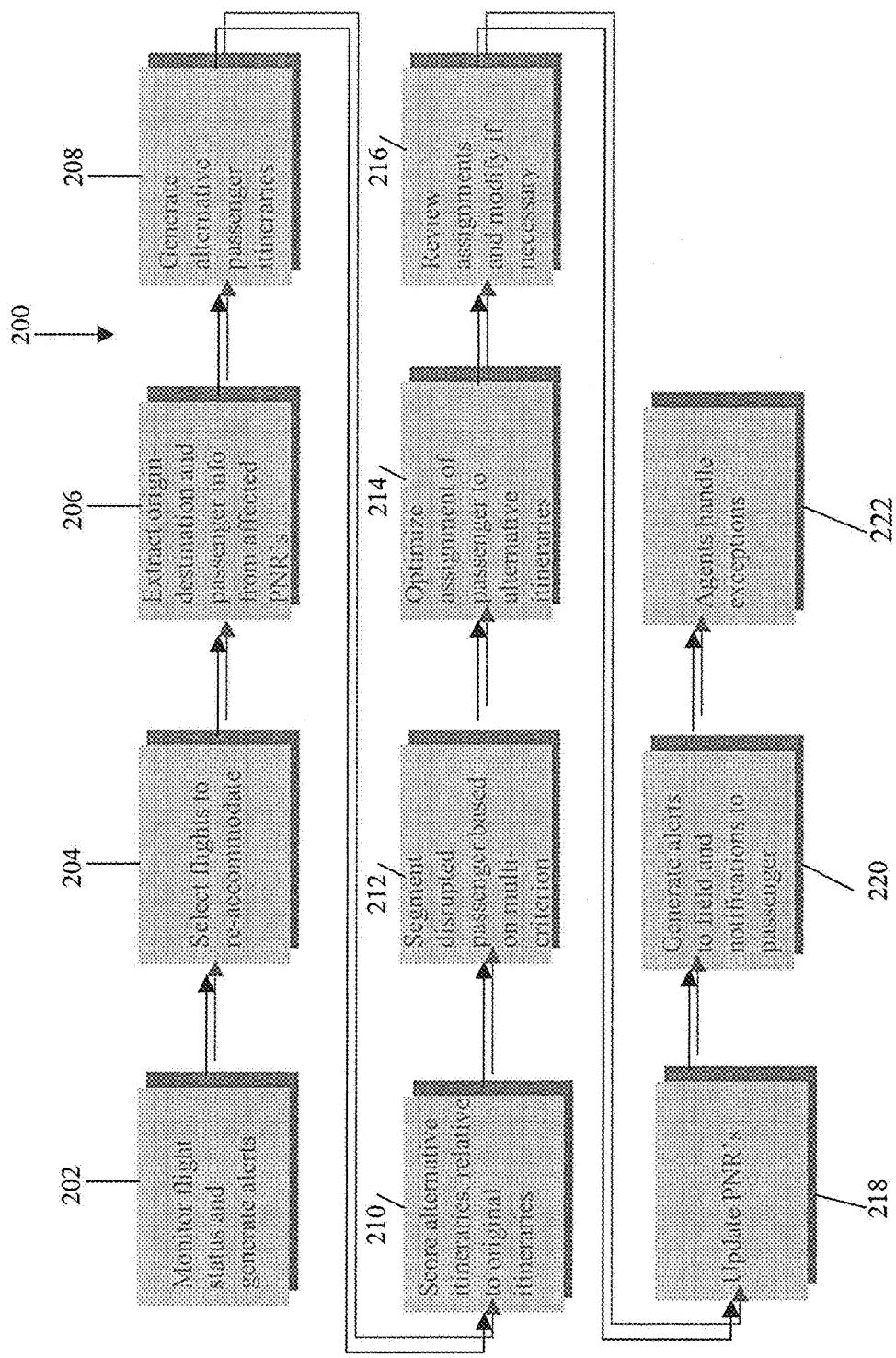
FIG. 2 is flow chart illustration of another exemplary embodiment of a process for accommodating disrupted travelers.

Referring now to FIG. 2, an alternate exemplary embodiment of a process 200 for accommodating disrupted airline travelers is illustrated. The accommodation process may begin by identifying a disrupting event by monitoring flight status and possibly generating an alert in step 202. The disrupting event may be an actual event, such as, for example, a transportation flight cancellation or delay. The disrupting event may also be an anticipated or desired transportation flight cancellation, delay or reschedule, such as, for example, an airline may see the need to cancel, delay or reschedule a flight and may want to assess the impact that the cancellation, delay or reschedule may have on the travelers. For purposes of illustrating this embodiment, the disrupting event is a flight cancellation.

The monitoring process may occur either manually or automatically. For example, a reservations agent, gate agent or control tower operation may be monitoring flights to detect actual or anticipated flight delays or cancellation. An electronic monitoring system may be utilized to perform the same monitoring function automatically.

When a disrupting event is detected (in this example, a flight cancellation), it may be selected as a candidate for the accommodation process, step 204. Once a disrupted flight is selected in step 204, reservation information, such as, for example, information generally referred to as an airline passenger name record ("PNR"), for a group of disrupted travelers may be accessed to extract the information about each traveler's travel origin and destination in step 206. In order to accommodate the largest number of passengers, the group of disrupted travelers may consist of all passengers on the cancelled flight. However, a subset of the entire group may be selected.

Alternative itineraries may also be generated for each disrupted traveler in the group in step 208. Limits on the number of alternative itineraries may be set in any way, such as, for example, the number of alternatives generated may be limited by a specified number or by the proximity of the departure time or arrival time to the same in the original itineraries. The alternative itineraries may be generated prior to the identification of the original itineraries and may be generated either manually or automatically.

In an exemplary embodiment, when generating alternative itineraries for a disrupted traveler, the logical "origin" and "destination" in the itinerary based on the time of day and where the traveler currently resides in the itinerary may be used to generate the alternate itinerary, not the original itinerary's specified origin and destination. For example, if a traveler is on the first flight segment of multi-segment itinerary and the second flight segment is cancelled, the logical origin for rebooking the traveler is at the destination airport of the first flight segment, not at the original itinerary's origin station. In another example, if the first segment of a traveler's itinerary is cancelled, the origin is the first segment's departure station, but the destination is the last segment's destination station, not the first segment's destination station. In another example, any origin or destination may be used to generate the alternate itinerary.

Once both the original and alternative itineraries are generated for each disrupted traveler in the group, a score may be generated for each alternative itinerary relative to the respective original itineraries in step 210. A score may be based on any predetermined criteria, such as, for example, any or all of the following: the new departure time; new arrival time; cabin downgrade; cabin upgrade; new number of stops; new elapsed time; and/or new departure or arrival airport. Each criterion may be weighted based on the impact to the traveler.

For example, the following criteria may be used to generate a score for each itinerary:

$$\text{Score} = (\text{weight})D\text{off} + (\text{weight})A\text{off} + (\text{weight})\text{NumStops} + (\text{weight})E\text{off} + (\text{weight})\text{CoTerm} + (\text{weight})\text{DnGrade} + (\text{weight})\text{UpGrade}$$

In this exemplary scenario, the lower the score is for an alternative itinerary, the less disruptive it is to the traveler. Each of the variables may be defined as set forth in the table below:

| PNR-Route Attributes | Variable | Weight | Description |
|---|---|---|---|
| Departure Time Offset | Doff | 1 | Factor representing the absolute difference between original and new departure times, divided by a first predetermined time increment and rounded down |
| Arrival Time Offset | Aoff | 1 | Factor representing the absolute difference between original and new arrival times, divided by a second predetermined time increment and rounded down |
| Number of Stops | NumStops | 4 | Factor representing the increase in the number of stops between the original and new itineraries |
| Elapsed Time Offset | Eoff | 1 | Factor representing the difference between original and new elapsed time, divided by a third predetermined time increment and rounded down |
| Co-terminal station | CoTerm | 8 | Factor representing the change in the airport at an origin or destination |
| Cabin-Segment Downgrade | DnGrade | 4 | Factor representing a cabin status downgrade for a traveler from the original itinerary to the alternative itinerary |
| Cabin-Segment Upgrade | UpGrade | 4 | Factor representing a cabin status upgrade for a traveler from the original itinerary to the alternative itinerary |

The Departure Time Offset and Arrival Time Offset variables may be represented in any way, such as, for example, by any index indicative of the difference between the original and new departure and arrival times as described in the table above. In addition, normalizing techniques may be used to allow for emphasis of Doff and Aoff variables as described in the table above with the use of the "first predetermined time increment" and the "second predetermined time increment". For example, (1) the absolute difference between the original and new departure times may be measured in minutes and a thirty minute first predetermined time increment may be used; and (2) the absolute difference between the original and new arrival times may be measured in minutes and a one hundred twenty minute second predetermined time increment may be used. In this example, by selecting the "first predetermined time increment" as thirty minutes relative to the one hundred twenty minute "second predetermined time increment," emphasis is provided on departure time. However, to emphasize arrival time, the first predetermined time increment may be changed to one hundred twenty minutes and the second predetermined time increment may be changed to thirty minutes.

Since an increase in the number of stops from the original itinerary increases the overall total travel time, a penalty per stop, such as, for example, a 2-hour penalty per stop, may be assigned. Therefore, a representative variable, NumStops, may be used. The NumStops variable may be any value, such as, for example, 0, 1, 2, 3, 4, etc.

Likewise, an increase in the total elapsed time from the original itinerary can be an inconvenience to the disrupted traveler. A variable representing this elapsed time difference, Eoff, may be used. As with Aoff and Doff, a third predetermined time increment may be used to normalize the elapsed time measure and provide an appropriate emphasis relative to the arrival offset and departure offset measures.

Some departure and arrival locations may be serviced by more than one airport, which could be used to accommodate a disrupted traveler. Since changing airports may present an inconvenience to the disrupted traveler, a variable representing a penalty, CoTerm, may be used. The CoTerm variable may be any value, such as, for example, 0, 1, 2, 3, 4, etc.

Cabin-Segment Upgrade and Downgrade variables, UpGrade and DnGrade respectively, allow an airline to introduce an index representing the impact of a cabin change. For example, a traveler that was originally booked in first class may be unhappy about being downgraded to coach. Alternatively, an airline may lose revenue if a traveler originally booked in coach is upgraded to first class. The UpGrade and DnGrade variables may be any value, such as, for example, 0, 1, 2, 3, 4, etc.

Each of the variables mentioned above may be weighted to provide the airline with additional flexibility in varying the impact that each variable has on the overall alternative itinerary score. The weight for any variable may be an actual number or a relative number. For example, in the table above, numbers are set forth by each of the variables. The numbers suggest that changing airports at the origin or destination is more disruptive than all the other variables due to the fact that the CoTerm weight is the highest. The weight may represent a penalty based on a time increment. For example, for a 30 minute time increment penalty, CoTerm variable corresponds to a 4 hour penalty per different airport due to the "8" weight factor.

In addition to weighting variables to tailor the score, there are several other factors that an airline may address to aid in the selection of alternative itineraries for disrupted travelers, such as, for example, the level of disruption to the traveler or profit impact to the airline. For example, an airline may categorize travelers into unique groups and handle each group differently in step 212. In the airline industry, as well as many other industries, travelers may be categorized based on the amount that they paid for the ticket, such as, for example, full fare, discount, special, etc. or by cabin, such as, for example, first class, coach, business class, etc.

FIGS. 3 and 4 illustrate exemplary embodiments of different ways to categorize or classify travelers. For example, in FIG. 3, travelers may be classified based on the frequency with which they use the airline, the Frequent Flyer Level, and the profitability of such use to the airline, Historical Profitability. In an exemplary embodiment, when an airline does not have any historical profitability data on a disrupted traveler, such as, for example, when a traveler does not participate in the airlines frequent flyer programs, any other indicator of a traveler's profitability may be used, such as, for example, the traveler's Fare Class may be used to assess profitability. An airline may even choose to assign priority to a traveler based on the Frequent Flyer Level, Historical Profitability or Fare Class or any combination of the three.

FIG. 4 shows an alternative approach to classifying travelers. For example, travelers may be classified based on the amount that they paid for a ticket, Fare Class, or the cabin in which they travel, Cabin Class. An airline may even choose to assign priority to a traveler based on either the Fare Class, the Cabin Class or both.

The categories may even be utilized in generating an alternate itinerary score to allow the score to be tailored to achieve an outcome representative of any given factor, such as, for example, an airline may present an upgrade or downgrade option to one category of travel and not another, which in turn may alter the score. Also, a combination of the categories may be used, such as, for example, the highest assigned priority between FIGS. 3 and 4 may be used.

Travelers may be categorized within each priority group to further differentiate travelers and tailor the assignment of itineraries to travelers to best meet the travelers' needs in many ways, such as, for example, by whether the disrupted itinerary is the traveler's originating itinerary or returning itinerary, whether the traveler is on an international itinerary or a domestic itinerary, and/or whether the disrupted traveler is currently at a connection city, the origin city, or the destination city. These categories may be used, for example, as tie-breaking rules in an algorithm that assigns alternative itinerary for the disrupted travelers.

Optimization techniques may be used to select alternative itineraries for each disrupted traveler in the selected group. The selected group may be all travelers disrupted by the disrupting event or a selected category of passengers. Any conventional optimization technique may be used, such as, for example, a mixed-integer linear technique.

The following equation provides an exemplary mathematical formulation of an exemplary mixed integer program (MIP) assignment model in accordance with an exemplary embodiment of an optimization technique that may be utilized in step 214 of FIG. 2:

$$\text{minimize}$$

$$\sum_i \sum_{r \in R_i} v_{ir} d_i x_{ir} + \sum_i p_i d_i s_i^-$$

subject to:

$$\sum_{r \in R_i} x_{ir} + s_i^- = 1; \forall i \in I$$

$$\sum_{r \in R_j} \sum_{i \in I_r} \delta_{ij} d_i x_{ir} + s_j^+ = c_j; \forall j \in F$$

$$x_{ir} \in \{0, 1\}; \forall i \in I, r \in R_i$$

$$s_i^- \geq 0, s_i^- \leq 1; \forall i \in I$$

$$s_j^+ \geq 0, s_j^+ \leq c_j; \forall j \in F$$

Each of the variables depicted in the MIP assignment model are defined as follows:

$i \in I \Rightarrow$ set of PNRs
$r \in R \Rightarrow$ set of alternate routes
$j \in F \Rightarrow$ set of flights
$R_i$=set of alternate routes for PNR i
$I_r$=set of PNRs associated with route r
$F_r$=set of flights belonging to route r
$R_j$=set of routes containing flight j
$d_i$=party size for PNR i
$p_i$=penalty for not accommodating PNR i
$c_j$=available seats on flight j
$v_{ir}$=score assigned to route r for PNR i $$\delta_{ij} = \begin{cases} 0 & \text{if } PNR \ i \text{ currently holds space on flight } j \\ 1 & \text{otherwise} \end{cases}$$

decision variables:

$$x_{ir} = \begin{cases} 1 & \text{if } PNR \ i \text{ assigned to route } r \\ 0 & \text{otherwise} \end{cases}$$

where:
$\forall j \in F$—represents a capacity constraint
$\forall i \in I$—represents a coverage constraint The variable definitions may be interpreted in different ways to tailor the optimization technique to the specific problem being solved. In an exemplary embodiment, flights j in F could be interpreted as actual flight legs scheduled between two cities, such as, for example, flight 100 from A to B, or it could be interpreted as specific cabin classes on flights scheduled between two cities, such as, for example, flight 100, F class from A to B. In another exemplary embodiment, a route r may be an ordered sequence of flight numbers between two cities A and C. such as, for example, flight 100 from A to B, connecting to flight 200 from B to C, or, alternatively, route r may be interpreted as an ordered sequence of flight numbers between two cities A and C, along with the cabin class assignment on each flight, such as, for example, flight 100, F class from A to B, connecting to flight 200, Y class from B to C. In this way, the same optimization algorithm may be tailored to multiple problem descriptions.

The techniques used to build the MIP assignment model and perform the optimization model described above are well known to those skilled in the area of linear and integer programming. Such techniques may be found in most standard textbooks on linear programming, including textbooks on basic introductions to operations research, such as, for example, "Introduction to Operations Research," by Frederick Hillier and Gerald Lieberman.

An airline may categorize or classify travelers during the optimization process to aid in the selection of alternative itineraries for disrupted travelers. For example, an airline may select an alternative itinerary via the optimization technique specified above on all disrupted travelers simultaneously or on a unique category or class of traveler.

The alternative itineraries for each disrupted traveler in the desired group may be reviewed and modified if necessary or desired after they are identified during the optimization process in step 216. The review may occur automatically based on a predetermined criterion or visually. Modifications may be made automatically or manually.

Once the assignment of alternative itineraries for each disrupted traveler in the group is final, several actions may be taken. For example, each PNR associated with the disrupted travelers may be updated with the alternative itinerary information in step 218. Notification of the changes to the itineraries may be generated and provided to anyone or thing associated with the airline that needs the information, such as, for example, baggage handlers, airport agents, crew organizers, etc., and to the traveler in step 220.

Also, exceptions to the alternative itinerary generation process described above may be handled either manually or automatically in step 222. For example, a reservations agent or airport agent may manually assign an alternative itinerary to a traveler if no alternative itinerary was generated or that which was generated was not acceptable.

Figure 5:
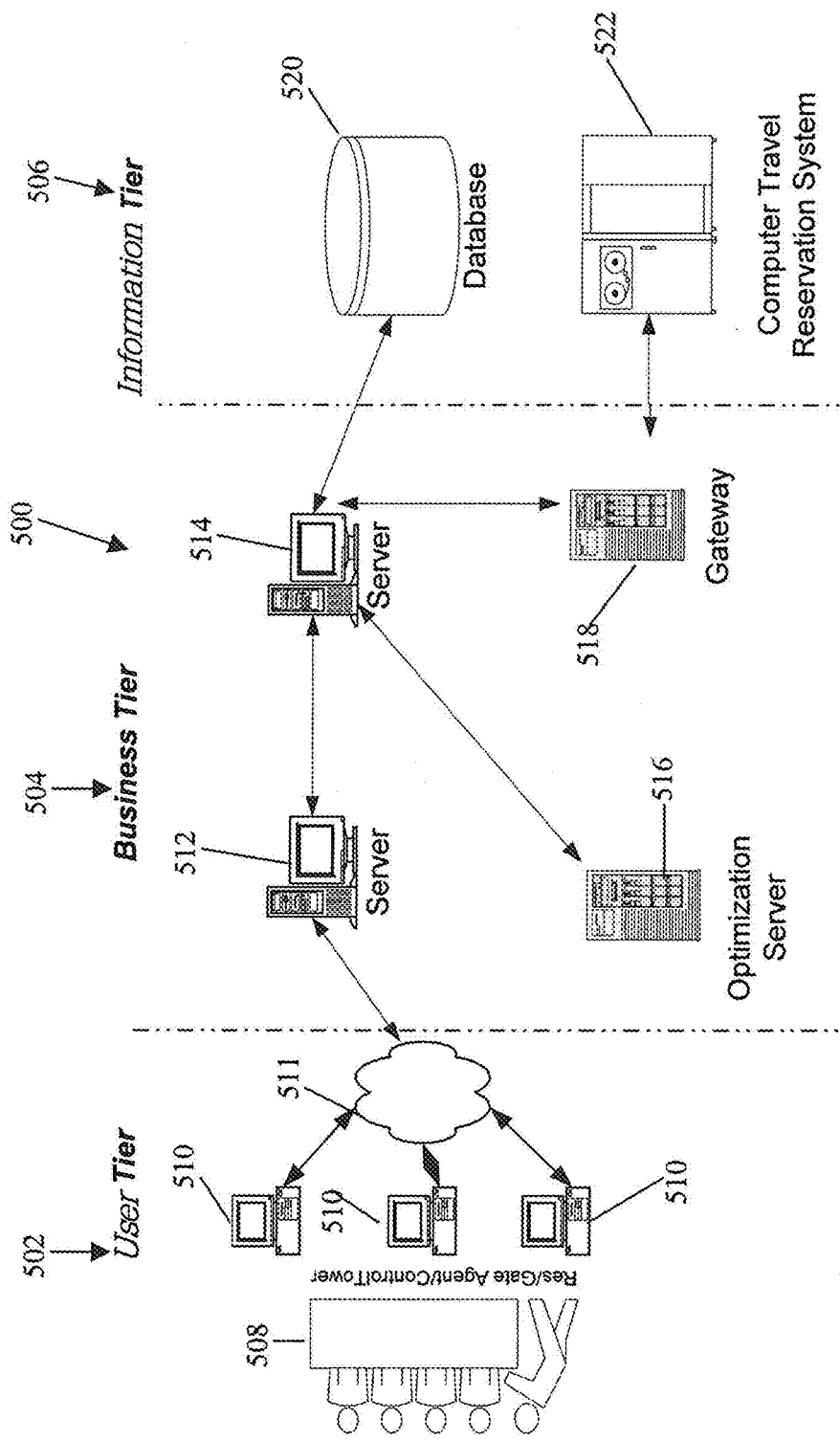
FIG. 5 is a schematic illustration of an exemplary embodiment of a system for accommodating disrupted travelers to implement the process of FIG. 2.

Referring to FIG. 5, a high level schematic illustration of an exemplary embodiment of a system 500 for accommodating disrupted travelers to implement the process of FIG. 2 is shown. For illustrative purposes only, the system is divided into a user tier 502, business tier 504 and information tier 506, which include a disrupting event detection mechanism, an alternative itinerary generation mechanism, an alternative itinerary score generating mechanism, and an alternative itinerary assignment optimizer.

In an exemplary embodiment, user tier 502 represents the system interface for entity 508 utilizing system 500. Entity 508 may be an entity needing to generate an alternative itinerary for a disrupted traveler, such as, for example a reservation agent, a gate agent or the control tower. Each entity 508 may initiate the process shown in FIG. 2 through one or more computing devices 510, such as, for example, personal computers, personal digital assistants, pagers, cellular telephones, and the like, and network 511.

For the sake of example, the computing devices 510 may include a central processing unit (CPU), a memory unit, an input/output (I/O) device, and an external interface. The external interface may be, for example, a modem, a wireless transceiver, and/or one or more network interface cards (NICs). It is understood that the computing devices 510 may be differently configured and that each of the listed components may actually represent several different components. For example, the CPU may actually represent a multi-processor or a distributed processing system; the memory unit may include different levels of cache memory, main memory, hard disks, and remote storage locations; and the I/O device may include monitors, keyboards, and the like. The network 511 may be a single network or may be a variety of different networks, such as an intranet and the Internet, and may include both wireline and wireless communication channels.

In an exemplary embodiment, business tier 504 may represent the processing components of system 500, which receives alternative itinerary requests from entity 508 and accesses information tier 506 to process the request. In this embodiment, business tier 504 includes computing devices or servers 512 and 514, optimization device or server 516 and gateway 518. In an exemplary embodiment, computing devices 512 and 514 may be standard servers, such as, for example, WebLogic Applications Servers distributed by BEA Systems, Inc. of California. In an exemplary embodiment, optimization device 516 may be an ILOG Cplex software distributed by ILOG, Inc. of California. In an exemplary embodiment, gateway 518 may be any data information processing gateway, such as, for example, the Databahn gateway distributed by Sabre, Inc. of Texas. Although this embodiment shows three devices in business tier 504, the processing and optimization functions could be performed by a single processing entity. The function of gateway 518 may also be performed by the same single processing entity.

In an exemplary embodiment, information tier 506 comprises database 520 and computer travel reservation system 522. In an exemplary embodiment, database 520 may be any conventional database, such as, for example, the Oracle database Enterprise Edition 9.x distributed by Oracle of California, accessible by server 514. In an exemplary embodiment, computer travel reservation system 522 may be any system capable of providing travel reservation information, which may be operated by the airline or by a third party, such as, for example, the system offered by Sabre Travel Network of Texas.

In an exemplary embodiment, communication between presentation tier 502, business tier 504, and information tier 506 may be through a wireless or wired link, and/or through intermediate networks. The intermediate network may be, for example, a complete network or a subnet of a local area network, a company wide intranet, and/or the Internet. Each entity or element of the tiers may be identified by an address or a combination of addresses, such as a media control access (MAC) address associated with a network interface and an Internet protocol (IP) address.

Figure 6:
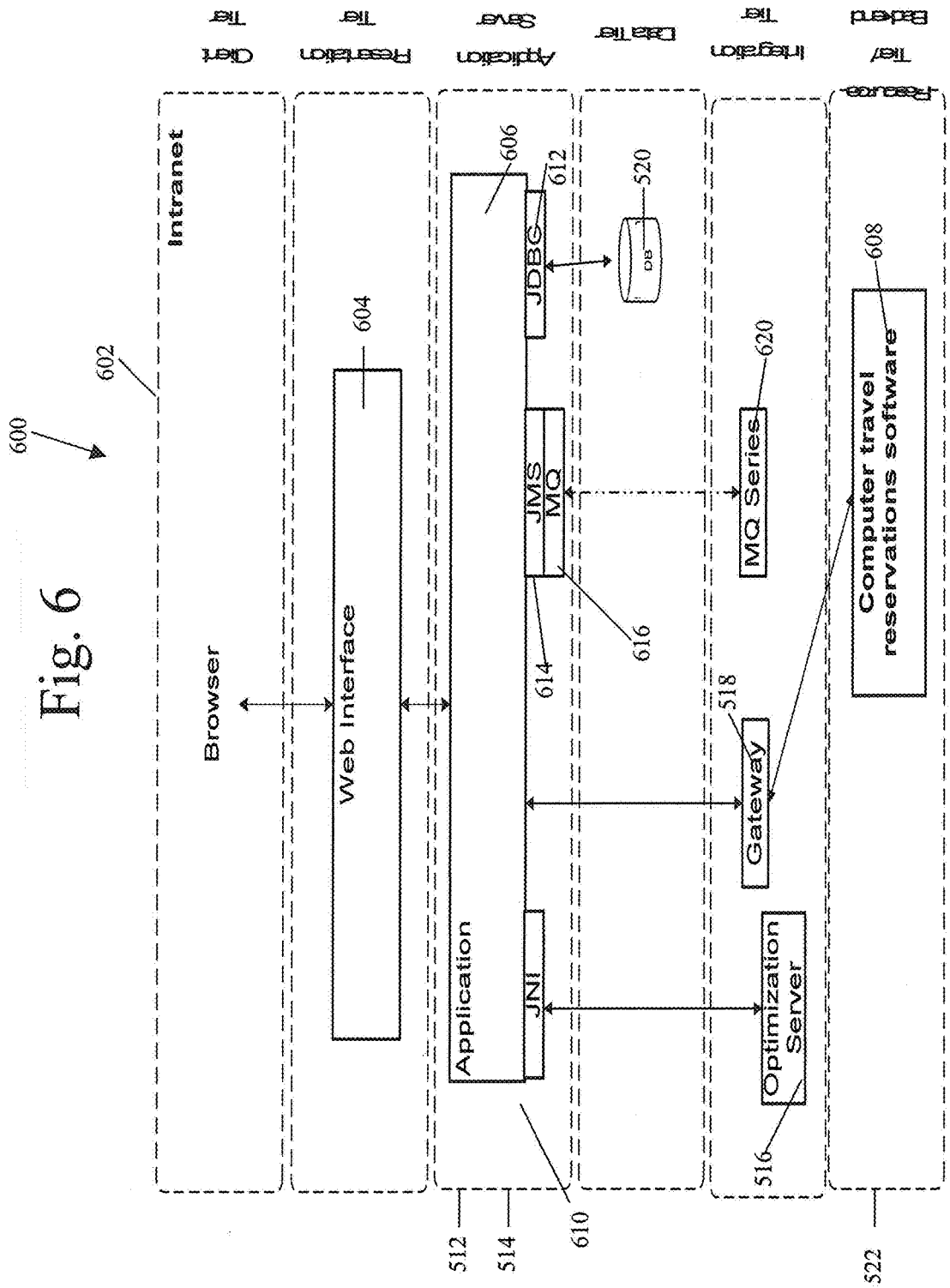
FIG. 6 is another schematic illustration of the exemplary embodiment of the system for accommodating disrupted travelers of FIG. 5.

FIG. 6 is another exemplary embodiment of a system 600 for accommodating disrupted travelers to implement the process of FIG. 2. In an exemplary embodiment, an entity may initiate the process of FIG. 2 from a company intranet browser 602 through web interface 604 and a network by accessing application 606 running on servers 512 and 514. Server 514 may collect PNR data through gateway 518 by interfacing with computer travel reservation software 608 running on computer travel reservation system 522. Server 514 may access optimization server 516 through a Java Native Interface (JNI) 610, the native programming interface for Java, which is distributed with standard Java Development Kit (JDK) from Sun Microsystems of California. Server 514 may access database 520 using JDBC technology 612, which may be an application program interface (API), included in Java 2 Platform, Standard Edition (J2SE) and Java 2 Platform, Enterprise Edition (J2EE) releases, that provides cross-DBMS, connectivity to a wide range of SQL databases and other tabular data sources, such as spreadsheets or flat files. DBMS is the middleware for transferring data between XML documents and relational databases.

In an exemplary embodiment, server 514 may also utilize: conventional Java Message Service (JMS) 614, a messaging standard that allows application components based on the J2EE to create, send, receive, and read messages; MQ 616, which is a messaging platform developed by International Business Machines Corporation of New York that provides Java and JMS interfaces; and MQSeries middleware 620 that provides an asynchronous communications function for application to application connection.

Figure 7:
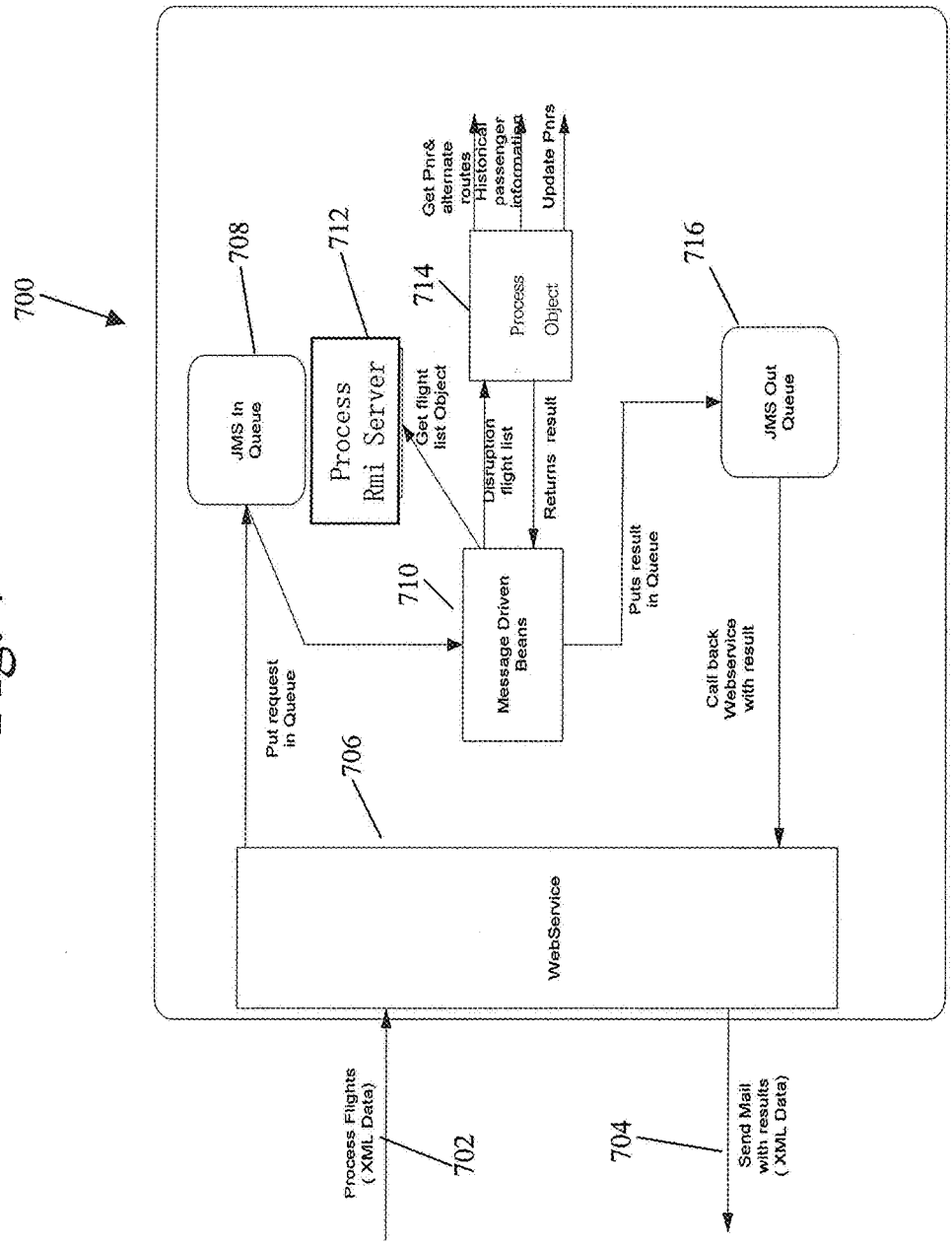
FIG. 7 is a schematic illustration of an exemplary embodiment of the server used for accommodating disrupted travelers of FIG. 5

FIG. 7 is an exemplary embodiment of server 512 or 514, application server 700. In this exemplary embodiment, components of the process of FIG. 2 running on server 700 may be implemented in Java. Server 700 may receive messages 702 requesting action on a flight and may send messages 704 providing alternative itineraries in XML format through a conventional WebService 706. Once message 702 is received, JMS may be utilized to communicate between the remaining components in FIG. 7. For example, request 702 is converted to JMS and placed in queue 708.

In an exemplary embodiment, message driven beans 710, enterprise beans that allows J2EE applications to process messages asynchronously, may be used on server 700 to implement steps of 206, 208, 210, 212, and 214 of FIG. 2. Java Remote Method Invocation (RMI) server 712, which may allow an object running in one Java Virtual Machine (VM) to invoke methods on an object running in another Java VM and may provide for remote communication between programs written in the Java programming language, may be used to synchronize requests. Process Object 714 may (1) route messages to computer travel reservation system 522 to request passenger PNR numbers, historical passenger information, passenger frequent-flyer status and/or historical profitability from Customer Relation Management (CRM) data, (2) perform the scoring and optimization functions of FIG. 2, (3) provide updates to the PNRs in computer travel reservation system 522, and (4) return result to JMS out queue 716. Messages in JMS out queue 716 may be sent to WebService 706 to provide the results back to the requester 704.

Figure 8:
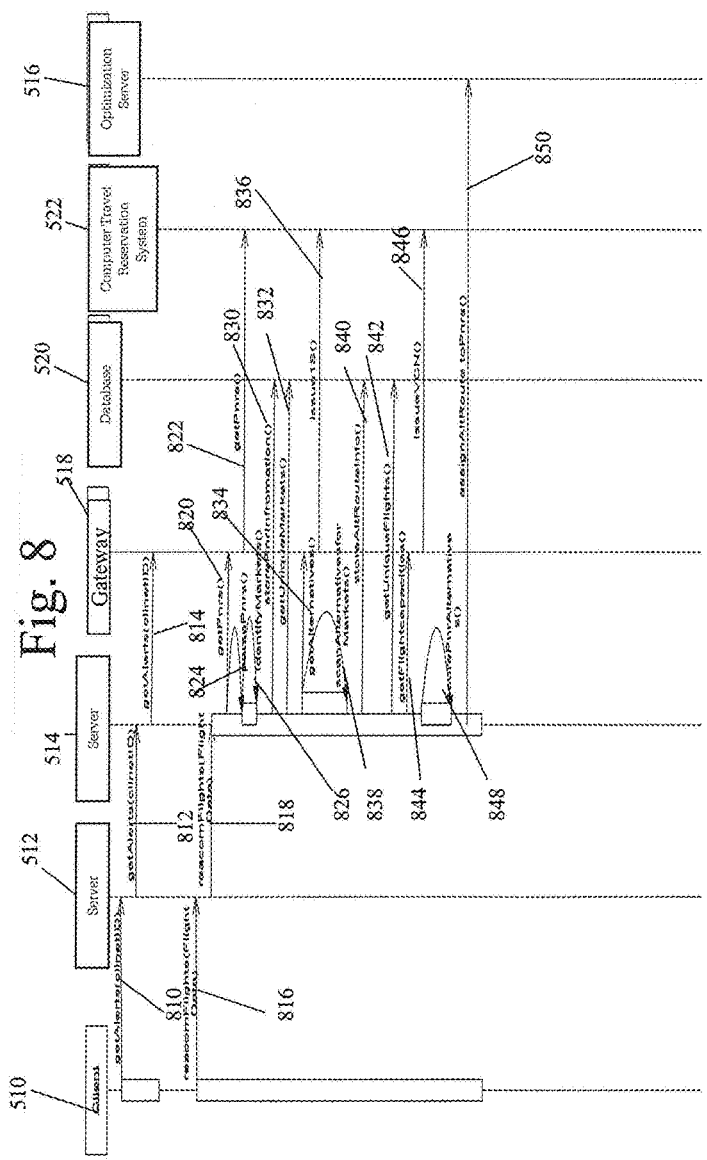
FIG. 8 is an exemplary sequence diagram illustrating the interaction between the system components of the system for accommodating disrupted travelers of FIG. 5.

FIG. 8 illustrates an exemplary embodiment of a method of operating system 500. The accommodation process may begin by monitoring flight status to identify a disrupting event, possibly by an alert, such as, for example by client 510 accessing servers 512, 514, and 518 in steps 810, 812, and 814. Then client 510 may select the disrupted flights having passengers to reschedule by requesting action through server 512 in step 816 and server 514 in step 818. Once a disrupted flight is selected, each traveler's PNR reservation information for a group of disrupted travelers may be accessed by server 514 requesting PNR data through gateway 518, step 820, from computer travel reservation system 522, step 822. Server 514 may parse the PNR data to extract relevant travel information step 824 including relevant markets step 826, such as, for example the origin and destination information. The information may be stored in database 520, step 830. Server 514 may acquire the alternative itineraries by first obtaining the unique markets associated with the disrupted travelers in step 832 by accessing the information in database 520. With the unique markets identified, server 514 may generate alternative itineraries by requesting them from computer travel reservation system 522 through gateway 520 and analyzing them, steps 834, 836 and 838. The gathered information may be stored in database 520 in step 840. Alternatively, server 514 may request alternative itineraries for each disrupted traveler.

Server 514 may identify each of the flights associated with the alternative itineraries stored in database 520 in step 842 and request capacity availability from the computer travel reservation system 522 through gateway 518, steps 844 and 846. In step 848, server 514 may perform a scoring function. Once the alternative itineraries are scored, server 514 may perform the assignment of passengers to itineraries by accessing optimization server 516 in step 850. Alternatively, server 514 may segment the disrupted travelers into separate groups prior to accessing optimization server 516 in step 850. In an exemplary embodiment, the PNRs may be updated with the new assignment.

Figure 9:
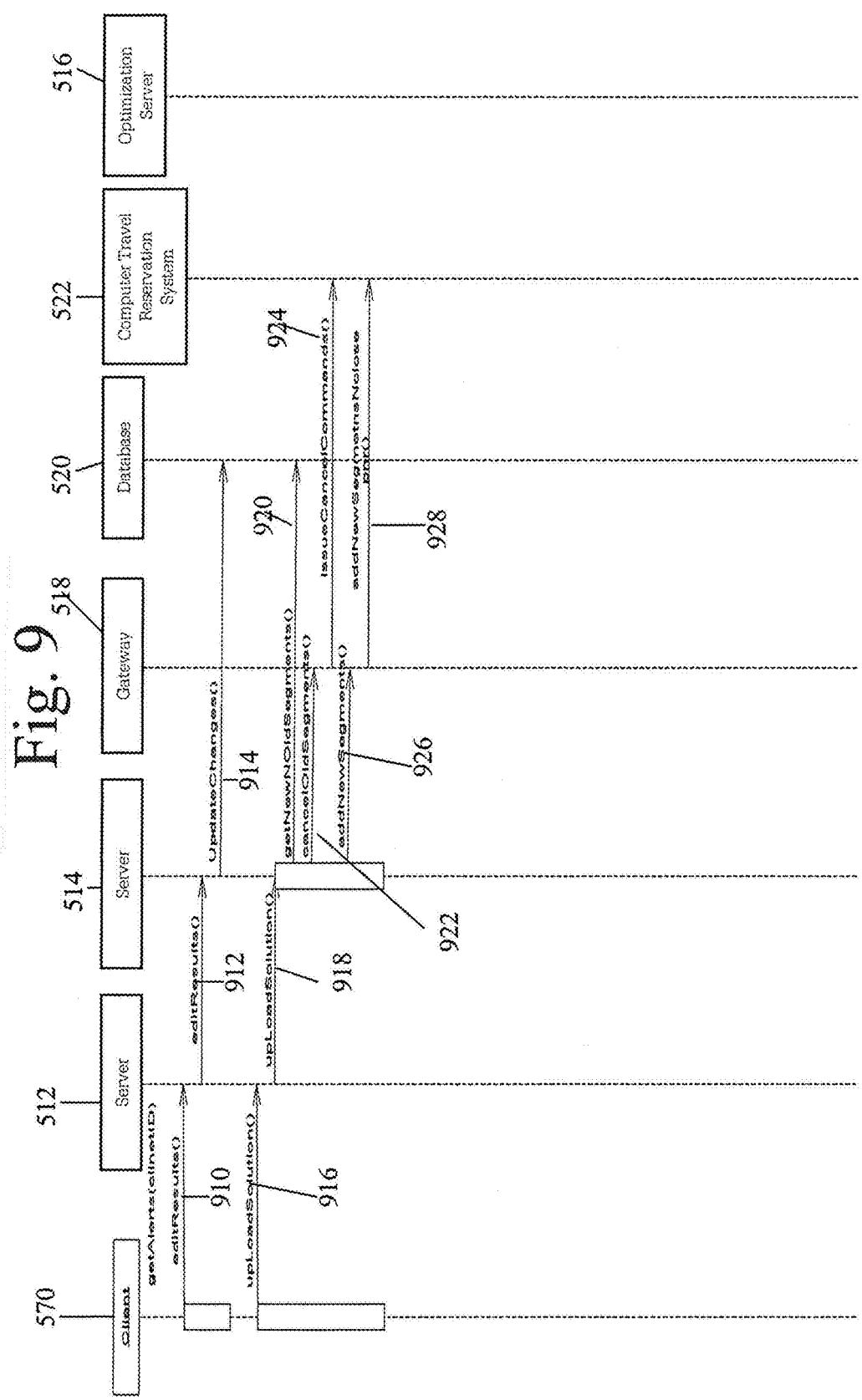
FIG. 9 is another exemplary sequence diagram illustrating the interaction between the system components of the system for accommodating disrupted travelers of FIG. 5.

FIG. 9 illustrates another exemplary embodiment of a method of operating system 500, in which client 510 may edit the optimized alternative itinerary selection through servers 512 and 514 and store the changes in database 520, steps 910, 912 and 914. Client 510 may also initiate the changes in computer travel reservation system 522 through server 512 and 514, steps 916 and 918. Server 514 may also (1) access the old reservation segment information associated with the newly assigned itinerary from database 520, step 920; (2) cancel the old segments in computer travel reservation system 520 through gateway 518, step 922 and 924; and (3) add the new segment information in computer travel reservation 520 through gateway 518, steps 926 and 928.

Referring now to FIGS. 10 through 14, in an exemplary embodiment, an example accommodation of disrupted travelers is illustrated. Referring first to FIG. 10, in an exemplary embodiment, a list of passengers and their respective itineraries affected by the cancellation of flight #1131 scheduled to travel from Hartford, Conn. (BDL) to Chicago, Ill. (ORD) is provided. The cancelled flight affected not only passengers traveling between BDL and ORD, but also passengers traveling to Kansas City, Mo. (MCI), Detroit, Mich. (DTW) and San Jose, Calif. (SJC).

Figure 11:
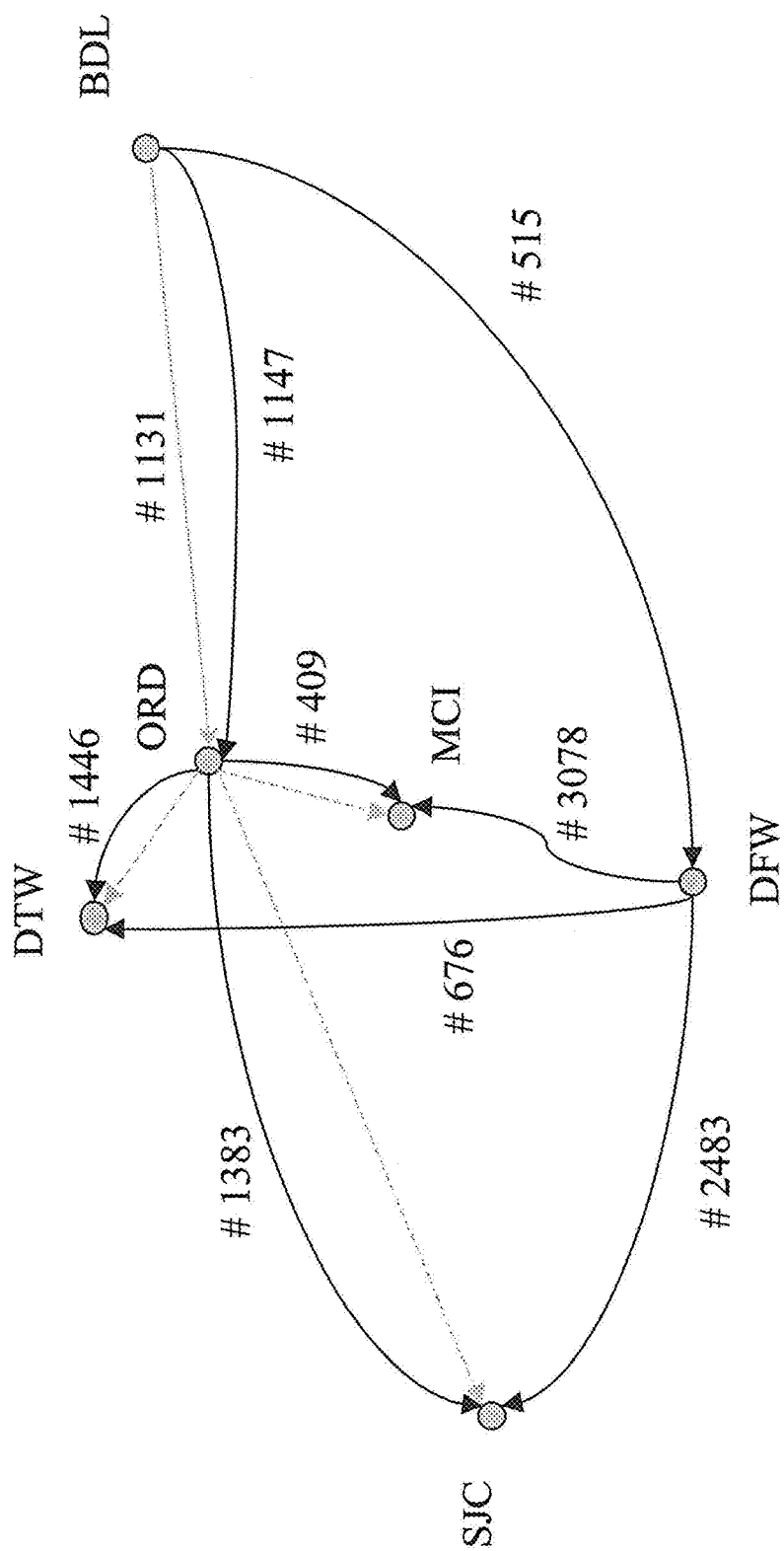
FIG. 11 is an illustration of exemplary routing alternatives associated with the passengers listed in FIG. 10.

Referring to FIG. 11, in an exemplary embodiment, possible alternative routes for the passengers listed in FIG. 10 are provided. In addition to the cities identified in the itineraries in FIG. 10, Dallas/Fort Worth Tex. (DFW) is included as a city for an alternate route.

Referring to FIG. 12, alternative itineraries for the passengers listed in FIG. 10 utilizing the alternate routes illustrated in FIG. 11, are listed per PNR. A score for each itinerary generated in accordance with the process of FIG. 2 is also shown.

Referring to FIG. 13, an exemplary list of factors, frequent flyer level, historical profitability and fare class, that may be used to segment the passengers of FIG. 10 into a group in accordance with an exemplary embodiment the process of FIG. 2 is provided. The assigned priority for each PNR is selected from the tables shown in FIGS. 3 and 4 with the higher assigned priority, with "1" being the highest, from each table being used. Any factor may be used to segment passengers into groups, such as, for example, only one or a combination or all of the factors presented in FIG. 13 may be used. Alternatively, in an exemplary embodiment, cabin class may be used. In an exemplary embodiment, fare classes F and A correspond to first class cabin (F), J would be business class cabin (J), and N and L coach class cabin (Y).

Referring to FIG. 14, in an exemplary embodiment, the resulting selected alternative itineraries for the passengers listed in FIG. 10 utilizing the process in FIG. 2 are illustrated. Even though the itinerary with the lowest score may represent the itinerary that is the least disruptive to the passenger, the lowest scoring itinerary may not be assigned, because in an exemplary embodiment, the process in FIG. 2 may be utilized to accommodate as many disrupted passengers as possible.

For example, in an exemplary embodiment, FIG. 10 shows two people traveling under PNR #1 and one person traveling under PNR #2. In an exemplary embodiment, FIG. 12 shows that two seats are available on flight #1147, itinerary #1 is the only available alternate itinerary for PNR #1, and, of the two alternate itineraries for PNR #2, itinerary #2 presents the best score. In an exemplary embodiment, itinerary #3 may be assigned for PNR#2 instead of itinerary #2, the itinerary with the better score, in order to accommodate both itinerary #1 passengers on flight #1147, because there are only two available seats on flight #1147. If PNR #2 is assigned itinerary #2 having the better assigned priority, then one of the passengers associated with PNR #1 will not be accommodated.

A method for accommodating travelers disrupted due to a disrupting event has been described that includes identifying the disrupting event, identifying original itineraries for the disrupted travelers affected by the disrupting event, generating alternative itineraries for the disrupted travelers, generating a score for each alternative itinerary for the disrupted travelers, and optimizing assignment of itineraries from the alternative itineraries for the disrupted travelers to accommodate the maximum number of disrupted travelers. In an exemplary embodiment, the method further comprises identifying origin location, departure time, destination and arrival time for the original itineraries. In an exemplary embodiment, the method further comprises generating alternative itineraries for the disrupted travelers' origin locations and destinations. In an exemplary embodiment, the score is based on a predetermined criteria. In an exemplary embodiment, the predetermined criteria is based on the perceived level of impact an alternate itinerary would have on the disrupted travelers. In an exemplary embodiment, optimizing assignment of itineraries further comprises assigning an itinerary from the alternative itineraries for the disrupted travelers based on the score for each alternative itinerary and the need to accommodate the maximum number of disrupted travelers. In an exemplary embodiment, optimizing assignment of itineraries further comprises considering profitability of each disrupted traveler to a travel supplier. In an exemplary embodiment, the profitability of each disrupted traveler is based on at least one of the following criteria: frequency of the use of the travel supplier by the disrupted traveler, profit associated with such use, and fare class of the disrupted traveler's original itinerary. In an exemplary embodiment, the original itineraries are identified for all disrupted travelers affected by the disrupting event. In an exemplary embodiment, the original itineraries are identified for a predetermined group of disrupted travelers affected by the disrupting event. In an exemplary embodiment, identifying original itineraries for the disrupted travelers affected by the disrupting event further comprises locating each traveler's travel information records. In an exemplary embodiment, optimizing assignment of itineraries accommodates the maximum number of disrupted travelers.

A System for accommodating travelers having original itineraries disrupted due to a disrupting event has been described that includes a disrupting event detection mechanism, an alternative itinerary generation mechanism operably coupled to the disrupting event detection mechanism, an alternative itinerary score generating mechanism operably coupled to the alternative itinerary generation mechanism and an alternative itinerary assignment optimizer operably coupled to the alternative itinerary generation mechanism and the alternative itinerary score generating mechanism. In an exemplary embodiment, the alternative itinerary generation mechanism comprises a computing device operably coupled to a computer travel reservation system. In an exemplary embodiment, the alternative itinerary score generating mechanism comprises a computing device that generates a score for each alternative itinerary for the disrupted travelers based on a predetermined criteria. In an exemplary embodiment, the computing device comprises an application server. In an exemplary embodiment, the alternative itinerary assignment optimizer comprises a computing device that selects alternate itineraries generated by the alternative itinerary generation mechanism for the disrupted travelers to accommodate the maximum number of disrupted travelers. In an exemplary embodiment, the computing device comprises a server. In an exemplary embodiment, the alternative itinerary generation mechanism, the alternative itinerary score generating mechanism, alternative itinerary assignment optimizer comprise a single computing device. A System for accommodating travelers having original itineraries disrupted due to a disrupting event has been described that includes a means for detecting a disrupting event, a means for generating an alternative itinerary operably coupled to the disrupting event detecting means, a means for generating an alternative itinerary score operably coupled to the alternative itinerary generating means and a means for optimizing and assigning alternative itinerary for the disrupted travelers operably coupled to the alternative itinerary generating means and the alternative itinerary score generating means. In an exemplary embodiment, the means for generating an alternative itinerary comprises a computing means operably coupled to a computer travel reservation system. In an exemplary embodiment, the means for generating an alternative itinerary score comprises a computing means that generates a score for each alternative itinerary for the disrupted travelers based on a predetermined criteria. In an exemplary embodiment, the computing means comprises an application server. In an exemplary embodiment, the means for optimizing and assigning alternative itineraries comprises a computing means that selects alternate itineraries generated by the means for generating an alternative itinerary for the disrupted travelers to accommodate the maximum number of disrupted travelers. In an exemplary embodiment, the computing means comprises a server wherein the means for generating an alternative itinerary, the means for generating an alternative itinerary score, the means for optimizing and assigning alternative itineraries comprise a single computing means.

A Method for accommodating travelers disrupted due to a disrupting event has been described that includes identifying the disrupting event, selecting a group of disrupted travelers, identifying original itineraries for the group of disrupted travelers affected by the disrupting event, generating alternative itineraries for the group of disrupted travelers, generating a score for each alternative itinerary for the group of disrupted travelers, and optimizing assignment of itineraries from the alternative itineraries for the group of disrupted passengers to accommodate the maximum number of disrupted travelers. In an exemplary embodiment, the method further comprises identifying origin location, departure time, destination and arrival time for the original itineraries. In an exemplary embodiment, the method further comprises generating alternative itineraries for the group of disrupted traveler's origin location and destinations. In an exemplary embodiment, the score is based on a predetermined criteria. In an exemplary embodiment, the predetermined criteria is based on the perceived level of impact an alternate itinerary would have on the disrupted travelers. In an exemplary embodiment, optimizing assignment of itineraries further comprises assigning an itinerary from the alternative itineraries for the disrupted travelers based on the score for each alternative itinerary and the need to accommodate the maximum number of disrupted travelers. In an exemplary embodiment, the group of disrupted travelers is selected by considering profitability of each disrupted traveler to a travel supplier. In an exemplary embodiment, the profitability of each disrupted traveler is based on at least one of the following criteria: frequency of the use of the travel supplier by the disrupted traveler, profit associated with such use, and fare class of the disrupted traveler's original itinerary. In an exemplary embodiment, the original itineraries are identified for all disrupted travelers affected by the disrupting event. In an exemplary embodiment, identifying original itineraries for the disrupted travelers affected by the disrupting event further comprises locating each disrupted traveler's travel information records. In an exemplary embodiment, optimizing assignment of itineraries accommodates the maximum number of disrupted travelers.

A Method for accommodating travelers disrupted due to a disrupting event has been disclosed that includes identifying the disrupting event, identifying origin location, departure time, destination and arrival time in original itineraries for the disrupted travelers affected by the disrupting event, generating alternative itineraries for the disrupted travelers' origin locations and destinations, generating a score for each alternative itinerary for the disrupted travelers based on the perceived level of impact an alternate itinerary would have on the disrupted travelers and optimizing assignment of itineraries from the alternative itineraries for the disrupted travelers based on the score for each alternative itinerary and the need to accommodate the maximum number of disrupted travelers. In an exemplary embodiment, optimizing assignment of itineraries further comprises considering profitability of each disrupted traveler to a travel supplier. In an exemplary embodiment, the profitability of each disrupted traveler is based on at least one of the following criteria: frequency of the use of the travel supplier by the disrupted traveler, profit associated with such use, and fare class of the disrupted traveler's original itinerary. In an exemplary embodiment, the original itineraries are identified for all disrupted travelers affected by the disrupting event. In an exemplary embodiment, the original itineraries are identified for a predetermined group of disrupted travelers affected by the disrupting event.

A computer-readable medium having stored thereon sequences of instruction for accommodating travelers disrupted due to a disrupting event has been disclosed that includes the sequence of instructions including instructions for performing the steps of identifying the disrupting event, identifying original itineraries for the disrupted travelers affected by the disrupting event, generating alternative itineraries for the disrupted travelers, generating a score for each alternative itinerary for the disrupted travelers, and optimizing assignment of itineraries from the alternative itineraries for the disrupted traveler to accommodate the maximum number of disrupted travelers. In an exemplary embodiment, the computer-readable medium further comprises identifying origin location, departure time, destination and arrival time for the original itineraries. In an exemplary embodiment, the computer-readable medium further comprises generating alternative itineraries for the disrupted travelers' origin locations and destinations. In an exemplary embodiment, the score is based on a predetermined criteria. In an exemplary embodiment, the predetermined criteria is based on the perceived level of impact an alternate itinerary would have on the disrupted travelers. In an exemplary embodiment, optimizing assignment of itineraries further comprises assigning an itinerary from the alternative itineraries for the disrupted travelers based on the score for each alternative itinerary and the need to accommodate the maximum number of disrupted travelers. In an exemplary embodiment, optimizing assignment of itineraries further comprises considering profitability of each disrupted traveler to a travel supplier. In an exemplary embodiment, the profitability of each disrupted traveler is based on at least one of the following criteria: frequency of the use of the travel supplier by the disrupted traveler, profit associated with such use, and fare class of the disrupted traveler's original itinerary. In an exemplary embodiment, the original itineraries are identified for all disrupted travelers affected by the disrupting event. In an exemplary embodiment, the original itineraries are identified for a predetermined group of disrupted travelers affected by the disrupting event. In an exemplary embodiment, identifying original itineraries for the disrupted travelers affected by the disrupting event further comprises locating each traveler's travel information records. In an exemplary embodiment, optimizing assignment of itineraries accommodates the maximum number of disrupted travelers.

Variations may be made in the foregoing without departing from the scope of the invention. For example, disrupting events may be any event actual or anticipated that would cause a disruption in a traveler's schedule. Any conventional hardware and software may be used to implement the processes in FIGS. 1 and 2.

While the examples and naming conventions used herein have been related to air travel, it is understood that the system and method for customer service transaction handling based on transaction history could be used in any form of travel, hospitality, and/or logistics industry, including the rail industry, cruise industry, shipping industry, hotels, and bus travel.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of automatically, and simultaneously, assigning respective optimized alternative itineraries to at least five airline passenger name records within a plurality of airline passenger name records, each of the airline passenger name records having a quantity of airline travelers and an original itinerary, the original itinerary having an initial origin, an initial departure time from the initial origin, a final destination, and a final arrival time to the final destination, the method comprising:
   executing a plurality of instructions with at least one processor of at least one computing device, the at least one computing device further comprising at least one memory unit in which the instructions are stored;
   wherein the instructions are executed with the at least one processor so that the following steps are executed:
      generating one or more candidate alternative itineraries for each of the airline passenger name records in the plurality of airline passenger name records,
         wherein each of the candidate alternative itineraries specifies one or more airline flights within a plurality of airline fights, each of the one or more airline flights having an available seat capacity,
         wherein at least one of the candidate alternative itineraries for at least one of the airline passenger name records specifies at least one airline flight within the plurality of airline flights that is also specified by at least one of the candidate alternative itineraries for at least one other of the airline passenger name records, the at least one airline flight having an available seat capacity that is less than the sum of the respective quantities of airline travelers of the at least one of the airline passenger name records and the at least one other of the airline passenger name records;
         wherein each of the candidate alternative itineraries has an initial origin and a final destination that are the same as the initial origin and the final destination, respectively, of the original itinerary of the corresponding airline passenger name record,
         wherein each of the candidate alternative itineraries has an initial departure time that is the same as, or different from, the initial departure time of the original itinerary of the corresponding airline passenger name record, and
         wherein each of the candidate alternative itineraries has a final arrival time that is the same as, or different from, the final arrival time of the original itinerary of the corresponding airline passenger name record;
      calculating a numerical and rankable score for each of the candidate alternative itineraries;
      wherein the numerical and rankable score for each of the candidate alternative itineraries=(first weight)*Doff+(second weight)*Aoff+(third weight)*NumStops+(fourth weight)*Eoff+(fifth weight)*CoTerm+(sixth weight)*DnGrade+(seventh weight)*UpGrade;
      wherein Doff is a first number representing a first absolute difference between the initial departure time of the original itinerary of the corresponding airline passenger name record and an initial departure time of the candidate alternative itinerary, the first absolute difference divided by a first predetermined time increment;
      wherein Aoff is a second number representing a second absolute difference between the final arrival time of the original itinerary of the corresponding airline passenger name record and the final arrival time of the candidate alternative itinerary, the second absolute difference divided by a second predetermined time increment;
      wherein NumStops is a third number representing an increase in a number of stops between the initial origin and the final destination of the original itinerary of the corresponding airline passenger name record and the initial origin and the final destination of the candidate alternative itinerary;
      wherein Eoff is a fourth number representing a third difference between an elapsed time associated with the original itinerary of the corresponding airline passenger name record and an elapsed time associated with the candidate alternative itinerary, the third difference divided by a third predetermined time increment;
      wherein CoTerm is a fifth number representing: a change of an airport at the initial origin of the original itinerary of the corresponding airline passenger name record compared to an airport at the initial origin of the candidate alternative itinerary; or a change of an airport at the final destination of the original itinerary of the corresponding airline passenger name record compared to an airport at the final destination of the candidate alternative itinerary;
      wherein DnGrade is a sixth number representing a cabin status downgrade;
      wherein UpGrade is a seventh number representing a cabin status upgrade;
      wherein each of the first, second, third, fourth, fifth, sixth, and seventh weights has a numerical value;
      wherein the numerical value of each of the third weight, the sixth weight, and the seventh weight is four times larger than the numerical value of each of the first weight, the second weight, and the fourth weight; and wherein the numerical value of the fifth weight is two times larger than the numerical value of each of the third weight, the sixth weight, and the seventh weight;

solving a mixed integer program assignment model to (a) generate a set of feasible solutions having respective objective function values and (b) determine, from the set of feasible solutions, the feasible solution having the minimum objective function value;

wherein each of the feasible solutions is a set of respective assignments of the candidate alternative itineraries to at least the at least five airline passenger name records in the plurality of airline passenger name records, wherein, for each of the feasible solutions, the assignments in the set of respective assignments are simultaneously identified, wherein each of the feasible solutions is generated so that the respective available seat capacities of the one or more airline flights specified by each of the candidate alternative itineraries are not exceeded and thus (i) the available seat capacity of the at least one airline flight is not exceeded and (ii) the solution is feasible, wherein the objective function value of each of the feasible solutions is based on at least the sum of the respective scores of the candidate alternative itineraries in the feasible solution, and wherein the determination of the feasible solution having the minimum objective function value results in the simultaneous identification of all of the respective optimized alternative itineraries for all of the at least five airline passenger name records within the plurality of airline passenger name records; and automatically, and simultaneously, assigning the respective optimized alternative itineraries to the at least five airline passenger name records within the plurality of airline passenger name records, wherein the respective optimized alternative itineraries are automatically, and simultaneously, assigned to the at least five airline passenger name records within the plurality of airline passenger name records only after (a) the generation of the set of feasible solutions having respective objective function values and (b) the determination, from the set of feasible solutions, of the feasible solution having the minimum objective function value and thus the simultaneous identification of all of the respective optimized alternative itineraries for all of the at least five airline passenger name records within the plurality of airline passenger name records, wherein the respective candidate alternative itineraries assigned in the feasible solution, which has been previously determined to have the minimum total objective function value, are the respective optimized alternative itineraries that are simultaneously identified and subsequently automatically, and simultaneously, assigned to the at least five airline passenger name records within the plurality of airline passenger name records, and wherein the occurrence of the determination of the feasible solution having the minimum objective function before the subsequent assignment of the respective optimized alternative itineraries to the at least five airline passenger name records enables the identification of the optimized alternative itineraries for the corresponding passenger name records in the at least five passenger name records to occur simultaneously so that each optimized alternative itinerary is identified at the same time as the other optimized alternative itineraries and so that each passenger name record is assigned an optimized alternative itinerary at the same time as the other passenger name records; and wherein the mixed integer program assignment model is represented by:

minimize minimize $$\sum_i \sum_{r \in R_i} v_{ir} d_i x_{ir} + \sum_i p_i d_i s_i^- \quad (1)$$

subject to:

$$\sum_{r \in R_i} x_{ir} + s_i^- = 1; \forall\, i \in I \quad (2)$$

$$\sum_{r \in R_j} \sum_{i \in I_r} \delta_{ij} d_i x_{ir} + s_j^+ = c_j; \forall\, j \in F \quad (3)$$

$$x_{ir} \in \{0, 1\}; \forall\, i \in I, r \in R_i \quad (4)$$

$$s_i^- \geq 0, s_i^- \leq 1; \forall\, i \in I \quad (5)$$

$$s_j^+ \geq 0, s_j^+ \leq c_j; \forall\, j \in F \quad (6)$$

where i is a passenger name record that belongs to a set of passenger name records I, with the set of passenger name records I being the plurality of airline passenger name records;

where r is an alternative itinerary that belongs to a set of alternative itineraries R, with the set of alternative itineraries R being the candidate alternative itineraries;

where j is a flight that belongs to a set of flights F;

where $R_i$ is a set of alternative itineraries for passenger name record i, with the set of alternative itineraries $R_i$ for the passenger name record i being the one or more candidate alternative itineraries for the passenger name record i;

where $I_r$ is a set of passenger name records associated with the alternative itinerary r;

where $F_r$ is a set of flights belonging to the alternative itinerary r;

where $R_j$ is a set of alternative itineraries containing the flight j;

where $d_i$ is a party size for the passenger name record i;

where $p_i$ is a penalty for not assigning an alternative itinerary to the passenger name record i;

where $c_j$ is the available seat capacity on the flight j;

where $v_{ir}$ is the score assigned to the alternative itinerary r for the passenger name record i;

where $\forall j \in F$ represents a capacity constraint;

where $\forall i \in I$ represents a coverage constraint;

where $$\delta_{ij} = \begin{cases} 0 & \text{if the passenger name record } i \text{ currently holds} \\ & \text{space on the flight } j \\ 1 & \text{otherwise} \end{cases};$$

where $$x_{ir} = \begin{cases} 1 & \text{if the passenger name record } i \text{ is assigned to} \\ & \text{the alternative itinerary } r \\ 0 & \text{otherwise} \end{cases}$$

wherein the capacity constraint ensures the available seat capacity on the flight j is not exceeded; and wherein the coverage constraint ensures each passenger name record i in the set of passenger name records I is assigned one of the alternative itineraries in the set of alternative itineraries $R_i$.

2. The method of claim 1, wherein the respective optimized alternative itineraries are automatically, and simultaneously, assigned to the at least five airline passenger name records in response to a disrupting event, the disrupting event affecting the respective original itineraries of all of the airline passenger name records in the plurality of airline passenger name records; and wherein the disrupting event is automatically detected using the at least one computing device.

3. The method of claim 1, wherein each of the airline passenger name records has an assigned priority, and wherein the respective objective function values of the feasible solutions are partially based on the respective assigned priorities of the airline passenger name records.

4. The method of claim 1, wherein, for each of the at least five airline passenger name records, the same optimized alternative itinerary is automatically, and simultaneously, assigned to each of the airline travelers in the airline passenger name record.

5. An apparatus for automatically, and simultaneously, assigning respective optimized alternative itineraries to at least five airline passenger name records within a plurality of airline passenger name records, each of the airline passenger name records having a quantity of airline travelers and an original itinerary, the original itinerary having an initial origin, an initial departure time from the initial origin, a final destination, and a final arrival time to the final destination, the apparatus comprising:

a non-transitory computer readable medium having stored thereon a plurality of instructions, wherein the instructions are executed with at least one processor so that the following steps are executed:

generating one or more candidate alternative itineraries for each of the airline passenger name records in the plurality of airline passenger name records, wherein each of the candidate alternative itineraries specifies one or more airline flights within a plurality of airline fights, each of the one or more airline flights having an available seat capacity, wherein at least one of the candidate alternative itineraries for at least one of the airline passenger name records specifies at least one airline flight within the plurality of airline flights that is also specified by at least one of the candidate alternative itineraries for at least one other of the airline passenger name records, the at least one airline flight having an available seat capacity that is less than the sum of the respective quantities of airline travelers of the at least one of the airline passenger name records and the at least one other of the airline passenger name records, wherein each of the candidate alternative itineraries has an initial origin and a final destination that are the same as the initial origin and the final destination, respectively, of the original itinerary of the corresponding airline passenger name record, wherein each of the candidate alternative itineraries has an initial departure time that is the same as, or different from, the initial departure time of the original itinerary of the corresponding airline passenger name record, and wherein each of the candidate alternative itineraries has a final arrival time that is the same as, or different from, the final arrival time of the original itinerary of the corresponding airline passenger name record;

calculating a numerical and rankable score for each of the candidate alternative itineraries;

wherein the numerical and rankable score for each of the candidate alternative itineraries=(first weight)*Doff+(second weight)*Aoff+(third weight)*NumStops+(fourth weight)*Eoff+(fifth weight)*CoTerm+(sixth weight)*DnGrade+(seventh weight)*UpGrade;

wherein Doff is a first number representing a first absolute difference between the initial departure time of the original itinerary of the corresponding airline passenger name record and an initial departure time of the candidate alternative itinerary, the first absolute difference divided by a first predetermined time increment;

wherein Aoff is a second number representing a second absolute difference between the final arrival time of the original itinerary of the corresponding airline passenger name record and the final arrival time of the candidate alternative itinerary, the second absolute difference divided by a second predetermined time increment;

wherein NumStops is a third number representing an increase in a number of stops between the initial origin and the final destination of the original itinerary of the corresponding airline passenger name record and the initial origin and the final destination of the candidate alternative itinerary;

wherein Eoff is a fourth number representing a third difference between an elapsed time associated with the original itinerary of the corresponding airline passenger name record and an elapsed time associated with the candidate alternative itinerary, the third difference divided by a third predetermined time increment;

wherein CoTerm is a fifth number representing: a change of an airport at the initial origin of the original itinerary of the corresponding airline passenger name record compared to an airport at the initial origin of the candidate alternative itinerary; or a change of an airport at the final destination of the original itinerary of the corresponding airline passenger name record compared to an airport at the final destination of the candidate alternative itinerary;

wherein DnGrade is a sixth number representing a cabin status downgrade;

wherein UpGrade is a seventh number representing a cabin status upgrade;

wherein each of the first, second, third, fourth, fifth, sixth, and seventh weights has a numerical value;

wherein the numerical value of each of the third weight, the sixth weight, and the seventh weight is four times larger than the numerical value of each of the first weight, the second weight, and the fourth weight; and wherein the numerical value of the fifth weight is two times larger than the numerical value of each of the third weight, the sixth weight, and the seventh weight;

solving a mixed integer program assignment model to (a) generate a set of feasible solutions having respective objective function values and (b) determine, from the set of feasible solutions, the feasible solution having the minimum objective function value;

wherein each of the feasible solutions is a set of respective assignments of the candidate alternative itineraries to at least the at least five airline passenger name records in the plurality of airline passenger names records, wherein, for each of the feasible solutions, the assignments in the set of respective assignments are simultaneously identified, wherein each of the feasible solutions is generated so that the respective available seat capacities of the one or more airline flights specified by each of the candidate alternative itineraries are not exceeded and thus (i) the available seat capacity of the at least one airline flight is not exceeded and (ii) the solution is feasible, wherein the objective function value of each of the feasible solutions is based on at least the sum of the respective scores of the candidate alternative itineraries in the feasible solution, and wherein the determination of the feasible solution having the minimum objective function value results in the simultaneous identification of all of the respective optimized alternative itineraries for all of the at least five airline passenger name records within the plurality of airline passenger name records; and automatically, and simultaneously, assigning the respective optimized alternative itineraries to the at least five airline passenger name records within the plurality of airline passenger name records, wherein the respective optimized alternative itineraries are automatically, and simultaneously, assigned to the at least five airline passenger name records within the plurality of airline passenger name records only after (a) the generation of the set of feasible solutions having respective objective function values and (b) the determination, from the set of feasible solutions, of the feasible solution having the minimum objective function value and thus the simultaneous identification of all of the respective optimized alternative itineraries for all of the at least five airline passenger name records within the plurality of airline passenger name records, wherein the respective candidate alternative itineraries assigned in the feasible solution, which has been previously determined to have the minimum total objective function value are the respective optimized alternative itineraries that are simultaneously identified and subsequently automatically, and simultaneously, assigned to the at least five airline passenger name records within the plurality of airline passenger name records, and wherein the occurrence of the determination of the feasible solution having the minimum objective function before the subsequent assignment of the respective optimized alternative itineraries to the at least five airline passenger name records enables the identification of the optimized alternative itineraries for the corresponding passenger name records in the at least five passenger name records to occur simultaneously so that each optimized alternative itinerary is identified at the same time as the other optimized alternative itineraries and so that each passenger name record is assigned an optimized alternative itinerary at the same time as the other passenger name records;

wherein the mixed integer program assignment model is represented by:

minimize $$\sum_i \sum_{r \in R_i} v_{ir} d_i x_{ir} + \sum_i p_i d_i s_i^- \quad (1)$$

subject to:

$$\sum_{r \in R_i} x_{ir} + s_i^- = 1; \forall i \in I \quad (2)$$

$$\sum_{r \in R_j} \sum_{i \in I_r} \delta_{ij} d_i x_{ir} + s_j^+ = c_j; \forall j \in F \quad (3)$$

$$x_{ir} \in \{0, 1\}; \forall i \in I, r \in R_i \quad (4)$$

$$s_i^- \geq 0, s_i^- \leq 1; \forall i \in I \quad (5)$$

$$s_j^+ \geq 0, s_j^+ \leq c_j; \forall j \in F \quad (6)$$

where i is a passenger name record that belongs to a set of passenger name records I, with the set of passenger name records I being the plurality of airline passenger name records;

where r is an alternative itinerary that belongs to a set of alternative itineraries R, with the set of alternative itineraries R being the candidate alternative itineraries;

where j is a flight that belongs to a set of flights F;

where $R_i$ is a set of alternative itineraries for passenger name record i, with the set of alternative itineraries $R_i$ for the passenger name record i being the one or more candidate alternative itineraries for the passenger name record i;

where $I_r$ is a set of passenger name records associated with the alternative itinerary r;

where $F_r$ is a set of flights belonging to the alternative itinerary r;

where $R_j$ is a set of alternative itineraries containing the flight j;

where $d_i$ is a party size for the passenger name record i;

where $p_i$ is a penalty for not assigning an alternative itinerary to the passenger name record i;

where $c_j$ is the available seat capacity on the flight j;

where $v_{ir}$ is the score assigned to the alternative itinerary r for the passenger name record i;

where $\forall j \epsilon F$ represents a capacity constraint;
where $\forall i \epsilon I$ represents a coverage constraint;
where $$\delta_{ij} = \begin{cases} 0 & \text{if the passenger name record } i \text{ currently holds space on the flight } j \\ 1 & \text{otherwise} \end{cases};$$

where $$x_{ir} = \begin{cases} 1 & \text{if the passenger name record } i \text{ is assigned to the alternative itinerary } r \\ 0 & \text{otherwise} \end{cases}$$

wherein the capacity constraint ensures the available seat capacity on the flight/is not exceeded; and
wherein the coverage constraint ensures each passenger name record i in the set of passenger name records I is assigned one of the alternative itineraries in the set of alternative itineraries $R_i$.

6. The apparatus of claim 5, wherein the respective optimized alternative itineraries are automatically, and simultaneously, assigned to the at least five airline passenger name records in response to an automatic detection of a disrupting event, the disrupting event affecting the respective original itineraries of all of the airline passenger name records in the plurality of airline passenger name records.

7. The apparatus of claim 5, wherein each of the airline passenger name records has an assigned priority, and wherein the respective objective function values of the feasible solutions are partially based on the respective assigned priorities of the airline passenger name records.

8. The apparatus of claim 5, wherein, for each of the at least five airline passenger name records, the same optimized alternative itinerary is automatically, and simultaneously, assigned to each of the airline travelers in the airline passenger name record.

* * * * *